US011474051B2

(12) United States Patent
Yang et al.

(10) Patent No.: US 11,474,051 B2
(45) Date of Patent: Oct. 18, 2022

(54) DUAL MODE DETECTION METHOD, CONTROLLER AND SYSTEM

(71) Applicants: NUCTECH COMPANY LIMITED, Beijing (CN); TSINGHUA UNIVERSITY, Beijing (CN)

(72) Inventors: Yigang Yang, Beijing (CN); Xuewu Wang, Beijing (CN); Zhi Zhang, Beijing (CN); Yuanjing Li, Beijing (CN); Jianmin Li, Beijing (CN)

(*) Notice: Subject to any disclaimer, the term of this patent is extended or adjusted under 35 U.S.C. 154(b) by 517 days.

(21) Appl. No.: 16/626,572

(22) PCT Filed: May 29, 2019

(86) PCT No.: PCT/CN2019/088919
§ 371 (c)(1),
(2) Date: Dec. 26, 2019

(87) PCT Pub. No.: WO2020/010951
PCT Pub. Date: Jan. 16, 2020

(65) Prior Publication Data
US 2021/0333224 A1 Oct. 28, 2021

(30) Foreign Application Priority Data
Jul. 11, 2018 (CN) .......................... 201810755428.5

(51) Int. Cl.
G01N 23/09 (2018.01)
G01N 23/02 (2006.01)
(Continued)

(52) U.S. Cl.
CPC ........... *G01N 23/09* (2013.01); *G01N 23/025* (2013.01); *G01N 23/05* (2013.01); *G01N 23/083* (2013.01);
(Continued)

(58) Field of Classification Search
CPC ....... G01N 23/09; G01N 23/025; G01N 23/05
See application file for complete search history.

(56) References Cited

U.S. PATENT DOCUMENTS 5,838,759 A * 11/1998 Armistead ........... G01V 5/0091
378/57
8,541,756 B1 9/2013 Treas
(Continued)

FOREIGN PATENT DOCUMENTS

CN 1723388 A 1/2006
CN 101128731 A 2/2008
(Continued)

OTHER PUBLICATIONS

Yigang Yang et al. "LINAC Based contraband detection technology research", Proceedings of the 15th China Academy of Nuclear Electronics and Nuclear Detection Technology Annual Conference, p. 704-711, Aug. 13, 2010.
(Continued)

Primary Examiner — Hugh Maupin
(74) Attorney, Agent, or Firm — Kilpatrick Townsend & Stockton, LLP

(57) ABSTRACT

The present disclosure provides a dual mode detection method, controller and system, which relates to the technical field of radiation detection. The dual mode detection method of the present disclosure includes: determining a ratio of neutron to X-ray differential cross sections of an inspected object, according to X-ray object detection data, X-ray object-free detection data, neutron object detection data, and neutron object-free detection data; determining a substance type of the inspected object according to a correspondence between the ratio of neutron to X-ray differential cross sections of the inspected object and the substance type.

20 Claims, 11 Drawing Sheets

(51) Int. Cl.
*G01N 23/05* (2006.01)
*G01N 23/083* (2018.01)

(52) U.S. Cl.
CPC ............... *G01N 2223/1006* (2013.01); *G01N 2223/106* (2013.01); *G01N 2223/1016* (2013.01)

(56) References Cited

U.S. PATENT DOCUMENTS

| | | | |
|---|---|---|---|
| 2006/0093088 A1* | 5/2006 | Sowerby | G01N 23/10 378/63 |
| 2012/0256094 A1 | 10/2012 | Pozzi et al. | |
| 2014/0321588 A1* | 10/2014 | Gozani | G01V 5/0091 376/154 |

FOREIGN PATENT DOCUMENTS

| | | |
|---|---|---|
| CN | 101329283 A | 12/2008 |
| CN | 101576513 A | 11/2009 |
| CN | 102109607 A | 6/2011 |
| CN | 102608651 A | 7/2012 |
| CN | 205374344 U | 7/2016 |
| CN | 106226339 A | 12/2016 |
| WO | 2017081452 A1 | 5/2017 |

OTHER PUBLICATIONS

Yigang Yang et al."Identification of High-Z Materials With Photoneutrons Driven by a Low-Energy Electron Linear Accelerator" IEEE Transactions on Nuclear Science, vol. 64, No. 7, total 6 pages, Jul. 2017.

* cited by examiner

Detection Data Acquisition Unit 711

Ratio Calculation Unit 712

FIG. 7

DUAL MODE DETECTION METHOD, CONTROLLER AND SYSTEM

CROSS-REFERENCES TO RELATED APPLICATIONS

This application is a U.S. National Stage to International Application No. PCT/CN2019/088919, filed on May 29, 2019, which based on and claims the benefit of priority to the Chinese patent application No. 201810755428.5, filed on Jul. 11, 2018, the content of each of which is hereby incorporated by reference in its entirety into the present application.

TECHNICAL FIELD

The present disclosure relates to the field of radiation detection technology, and particular to a dual mode detection method, controller and system.

BACKGROUND

Transmission imaging using X-rays generated by an electron accelerator is a conventional technique for obtaining mass thickness information of a substance to be detected, but such technique is not suitable for material identification. In order to improve the capability of material identification, or even to analyze isotope information, it is necessary to utilize two or more types of radiation.

BRIEF SUMMARY OF THE INVENTION

According to an aspect of some embodiments of the present disclosure, a dual mode detection method is provided, comprising: determining a ratio of neutron to X-ray differential cross sections of an inspected object, according to X-ray object detection data, X-ray object-free detection data, neutron object detection data, and neutron object-free detection data; determining a substance type of the inspected object according to a correspondence between the ratio of neutron to X-ray differential cross sections of the inspected object and the substance type.

In some embodiments, when the inspected object is placed between a first detection port of the dual mode detection device and an X-ray detector, obtaining the X-ray object detection data according to a detection result of the X-ray detector, and obtaining the neutron object-free detection data according to a detection result of a neutron detector; when the inspected object is placed between a second detection port of the dual mode detection device and the neutron detector, obtaining the X-ray object-free detection data according to a detection result of the X-ray detector, and obtaining the neutron object detection data according to a detection result of the neutron detector; wherein, the first detection port emits X-rays, and the second detection port emits neutrons.

In some embodiments, the dual mode detection device simultaneously emits electrons to an X-ray conversion target and a neutron conversion target through a single electron accelerator, X-rays generated by the X-ray conversion target emitted from the first detection port, and neutrons generated by the neutron conversion target emitted from the second detection port.

In some embodiments, determining the ratio of neutron to X-ray differential cross sections of the inspected object comprises:

determining a neutron mass attenuation condition of the inspected object according to the neutron object detection data and the neutron object-free detection data; determining an X-ray mass attenuation condition of the inspected object according to the X-ray object detection data and the X-ray object-free detection data; determining the ratio of neutron to X-ray differential cross sections of the inspected object according to the neutron mass attenuation condition and the X-ray mass attenuation condition of the inspected object.

In some embodiments, determining the ratio of neutron to X-ray differential cross sections of the inspected object comprises: determining the ratio F(n) of neutron n to the X-ray differential cross sections of the inspected object according to a formula:

$$F(n) = \frac{\sigma_n}{\sigma_X} = \frac{\ln \frac{I_{n,0}}{I_{n,D}}}{\ln \frac{I_{X,0}}{I_{X,D}}}$$

wherein $\sigma_n$ is the neutron differential cross section of the inspected object, and $\sigma_X$ is the X-ray differential cross section of the inspected object, $I_{n,0}$ is the neutron object-free detection data, $I_{n,D}$ is the neutron object detection data, $I_{X,0}$ is the X-ray object-free detection data, and $I_{X,D}$ is the X-ray object detection data.

In some embodiments, the dual mode detection method further comprises: determining relative contents of various nuclides in the inspected object according to the ratios of neutron to X-ray differential cross sections of the inspected object at different neutron energy.

In some embodiments, determining relative contents of various nuclides in the inspected object comprises: determining the relative contents A1~Ak of various types of nuclides according to a formula:

$$\begin{bmatrix} A_1 \\ A_2 \\ \vdots \\ A_k \end{bmatrix} = \begin{bmatrix} \frac{\sigma_{n_1,1}}{\sigma_{X,1}}, \frac{\sigma_{n_1,2}}{\sigma_{X,2}}, \cdots, \frac{\sigma_{n_1,k}}{\sigma_{X,k}} \\ \frac{\sigma_{n_2,1}}{\sigma_{X,1}}, \frac{\sigma_{n_2,2}}{\sigma_{X,2}}, \cdots, \frac{\sigma_{n_2,k}}{\sigma_{X,k}} \\ \vdots \\ \frac{\sigma_{n_m,1}}{\sigma_{X,1}}, \frac{\sigma_{n_m,2}}{\sigma_{X,2}}, \cdots, \frac{\sigma_{n_m,k}}{\sigma_{X,m}} \end{bmatrix}^{-1} \begin{bmatrix} F(n_1) \\ F(n_2) \\ \vdots \\ F(n_m) \end{bmatrix}$$

where $\sigma_{ni,j}$ is the neutron differential cross section of the j-th nuclide in the i-th energy region, $\sigma_{X,j}$ is the X-ray differential cross section of the j-th nuclide, F(ni) is the ratio of neutron to X-ray differential cross sections of the inspected object with respect to neutrons and X-rays in the i-th energy region, and Aj is the relative content of the j-th nuclide, 1≤i≤m,1≤j≤k, m is the number of neutron energy regions, k is the number of the nuclides types, wherein the number of energy regions is adjusted during the measurement so that m=k.

In some embodiments, the dual mode detection method further comprises imaging according to the ratio of neutron to X-ray differential cross sections of the inspected object.

According to another aspect of some embodiments of the present disclosure, a dual mode detection controller is provided, comprising: a ratio determination device configured to determine a ratio of neutron to X-ray differential cross sections of an inspected object, according to X-ray object detection data, X-ray object-free detection data, neutron object detection data, and neutron object-free detection data; a substance determination device configured to determine a substance type of the inspected object identification according to the ratio of neutron to X-ray differential cross sections of the inspected object.

In some embodiments, the ratio determination device comprises: a detection data acquisition unit configured to, when the inspected object is placed at a first detection port, obtain the X-ray object detection data according to a detection result of an X-ray detector, and obtain the neutron object-free detection data according to a detection result of a neutron detector; when the inspected object is placed at a second detection port, obtain the neutron object detection data according to a detection result of the neutron detector, and obtain the X-ray object-free detection data according to a detection result of the X-ray detector, wherein the first detection port emits X-rays, and the second detection port emits neutrons; a ratio calculation unit configured to determine the ratio of neutron to X-ray differential cross sections of the inspected object according to the X-ray object detection data, the X-ray object-free detection data, the neutron object detection data, and the neutron object-free detection data.

In some embodiments, the ratio calculation unit is configured to: determine a neutron mass attenuation condition of the inspected object according to the neutron object detection data and the neutron object-free detection data; determine an X-ray mass attenuation condition of the inspected object according to the X-ray object detection data and the X-ray object-free detection data; determine a ratio of neutron to X-ray differential cross sections of the inspected object according to the neutron mass attenuation condition and the X-ray mass attenuation condition of the object; determine a substance type of the inspected object according to a correspondence between the ratio of neutron to X-ray differential cross sections of the inspected object and the substance type.

In some embodiments, the ratio calculation unit is configured to: determine a ratio F(n) of neutron n to X-ray differential cross sections of the inspected object according to a formula:

$$F(n) = \frac{\sigma_n}{\sigma_X} = \frac{\ln\frac{I_{n,0}}{I_{n,D}}}{\ln\frac{I_{X,0}}{I_{X,D}}}$$

wherein $\sigma_n$ the neutron differential cross section of the inspected object, and $\sigma_X$ is the X-ray differential cross section of the inspected object, $I_{n,0}$ is the neutron object-free detection data, $I_{n,D}$ is the neutron object detection data, $I_{X,0}$ is the X-ray object-free detection data, and $I_{X,D}$ is the X-ray object detection data.

In some embodiments, the substance determination module is further configured to: determine relative contents of various nuclides in the inspected object according to ratios of neutron to X-ray differential cross sections of the inspected object at different neutron energy.

In some embodiments, determining relative contents of various nuclides in the inspected object comprises: determining the relative contents $A_1 \sim A_k$ of various types of nuclides according to a formula:

$$\begin{bmatrix} A_1 \\ A_2 \\ \vdots \\ A_k \end{bmatrix} = \begin{bmatrix} \frac{\sigma_{n_1,1}}{\sigma_{X,1}}, \frac{\sigma_{n_1,2}}{\sigma_{X,2}}, \ldots, \frac{\sigma_{n_1,k}}{\sigma_{X,k}} \\ \frac{\sigma_{n_2,1}}{\sigma_{X,1}}, \frac{\sigma_{n_2,2}}{\sigma_{X,2}}, \ldots, \frac{\sigma_{n_2,k}}{\sigma_{X,k}} \\ \vdots \\ \frac{\sigma_{n_m,1}}{\sigma_{X,1}}, \frac{\sigma_{n_m,2}}{\sigma_{X,2}}, \ldots, \frac{\sigma_{n_m,k}}{\sigma_{X,m}} \end{bmatrix}^{-1} \begin{bmatrix} F(n_1) \\ F(n_2) \\ \vdots \\ F(n_m) \end{bmatrix}$$

where $\sigma_{ni,j}$ is the neutron differential cross section of the j-th nuclide in the i-th energy region, $\sigma_{X,j}$ is the X-ray differential cross section of the j-th nuclide, $F(n_i)$ is the ratio of neutron to X-ray differential cross sections of the inspected object with respect to neutrons and X-rays in the i-th energy region, and $A_j$ is the relative content of the j-th nuclide, $1 \leq i \leq m, 1 \leq j \leq k$, m is the number of neutron energy regions, k is the number of the nuclides types, wherein the number of energy regions is adjusted during the measurement so that m=k.

In some embodiments, the dual mode detection controller further comprises: an imaging device configured to perform imaging according to the ratio of neutron to X-ray differential cross sections of the inspected object.

According to another aspect of some embodiments of the present disclosure, a dual mode detection controller is provided, comprising: a memory; a processor coupled to the memory, the processor is configured to perform a method based on the program stored in the memory according to any dual mode detection method described above.

According to another aspect of some embodiments of the present disclosure, a computer-readable storage medium is provided on which computer program instructions are stored, which implement the steps of the method according to any dual mode detection method described above when executed by a processor.

According to an aspect of some embodiments of the present disclosure, a dual mode detection system is provided, comprising: any dual mode detection controller described above; and a dual mode detection device, comprising: a single electron accelerator configured to synchronously emit electrons to an X-ray conversion target and a neutron conversion target; the X-ray conversion target is configured to generate X-rays under excitation of electrons and emit the X-rays from a first detection port; the neutron conversion target is configured to generate neutrons under excitation of electrons and emit the neutrons from a second detection port.

In some embodiments, the dual mode detection device comprises at least one of: an X-ray chopper located between the neutron conversion target and the second detection port; an X-ray collimator located between the X-ray conversion target and the first detection port; or a neutron collimator located between the neutron conversion target and the second detection port.

In some embodiments, a line connecting the first detection port and the X-ray conversion target is substantially perpendicular to a line connecting the second detection port and the neutron conversion target.

BRIEF DESCRIPTION OF THE DRAWINGS

The drawings described herein are used to provide a further understanding of the present disclosure and constitute a part of the present disclosure. The illustrative embodiments of the present disclosure as well as the descriptions thereof, which are used for explaining the present disclosure, do not constitute improper definitions on the present disclosure. In the accompanying drawings:

FIG. 7 is a schematic diagram of the ratio determination device in the dual mode detection controller according to some embodiments of the present disclosure;

DETAILED DESCRIPTION OF THE INVENTION

The technical solution of the present disclosure is further described in detail by means of the drawings and embodiments.

Although some new X-ray imaging detection technologies, such as dual-energy X-ray, CT (Computed Tomography) technologies, have improved recognition capabilities, it is still difficult to overcome the inherent shortcoming of not being able to identify the type of element. An object of the present disclosure is to provide a scheme for realizing substance type identification by using neutrons and X-rays.

Figure 1:
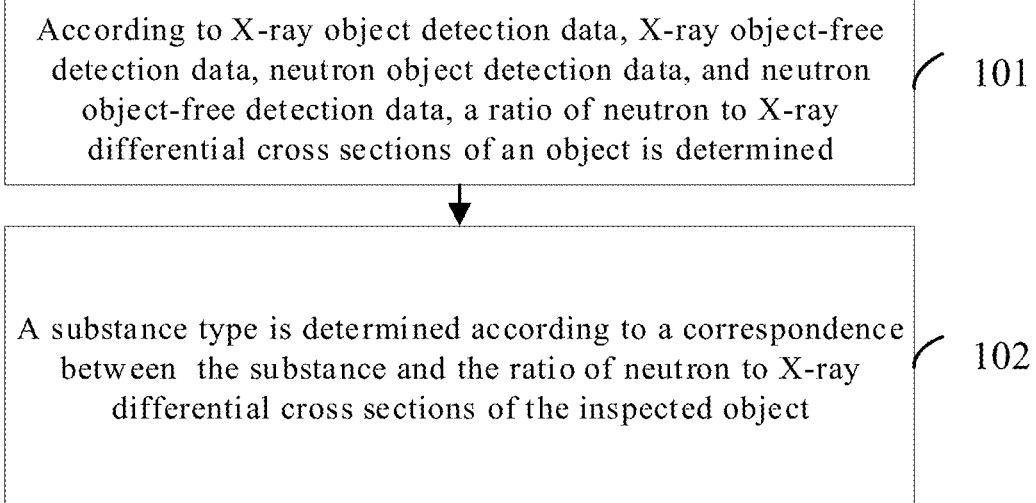
FIG. 1 is a flowchart of the dual mode detection method according to some embodiments of the present disclosure.

FIG. 1 is a flowchart of the dual mode detection method according to some embodiments of the present disclosure.

At step 101, according to X-ray object detection data, X-ray object-free detection data, neutron object detection data, and neutron object-free detection data, a ratio of neutron to X-ray differential cross sections of an inspected object is determined. In some embodiments, the X-ray object detection data, X-ray object-free detection data, neutron object detection data, and neutron object-free detection data may be obtained by placing the inspected object in the X-ray detection area and a neutron detection area respectively while maintaining the ray intensity of an X-ray source and a neutron source unchanged. Since the thickness of the inspected object is constant, a ratio of neutron to X-ray differential cross sections of the inspected object can be calculated based on the above data.

At step 102, a substance type of the inspected object is identified according to a correspondence between the ratio of neutron to X-ray differential cross sections of the object and the substance type. In some embodiments, the substance type of the inspected object can be determined through comparison the calculated ratio with ratios of neutron to X-ray differential cross sections of different substances that are stored in advance.

In some embodiments, it is also possible to perform imaging based on the ratio of neutron to X-ray differential cross sections of the inspected object, such as displaying in different colors for different ratio ranges, or highlighting determined dangerous substances, thereby the detection results is visualized and the user friendliness is improved.

In this way, detection data can be obtained with X-rays and neutrons attenuated by the inspected object and not attenuated by the inspected object, thereby a ratio of neutron to X-ray differential cross sections of the inspected object can be obtained. A substance type of the inspected object is then determined by the correspondence between different substances and ratios of neutron to X-ray differential cross sections of the substances, thereby realizing the dual energy detection of the inspected object by using neutrons and X-rays. Because of different neutron and X-ray attenuation capabilities of different substances, a nuclide type can be recognized, so that element type identification can be realized, and the accuracy of detection can be improved.

Figure 2:
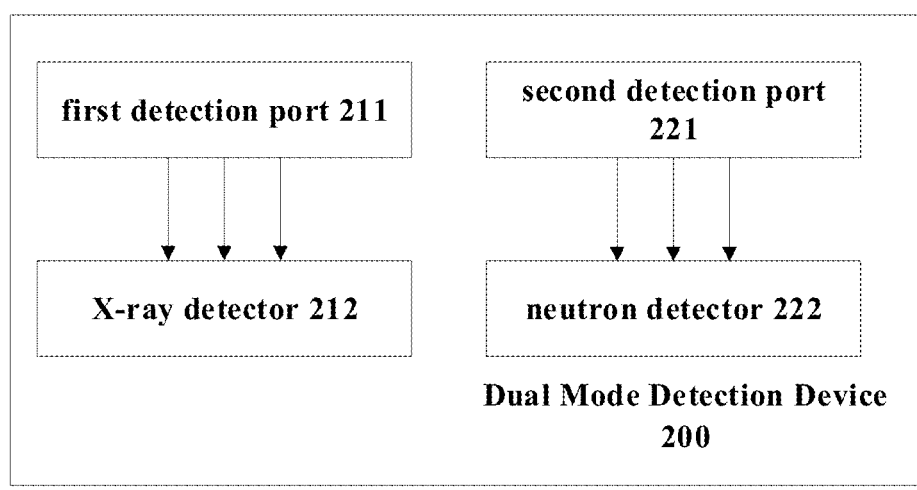
FIG. 2 is a schematic diagram of the dual mode detection device employed in the dual mode detection method according to some embodiments of the present disclosure.

In some embodiments, the dual mode detection device shown in FIG. 2 can be used for the acquisition of detection data. The dual mode detection device 200 may include a first detection port 211, an X-ray detector 212, a second detection port 221, and a neutron detector 222. X-ray beams emitted by the first detection port 211 are received by the X-ray detector 212, neutron beams emitted by the second detection port 221 are received by the neutron detector 222. When the inspected object is placed between the first detection port 211 and the X-ray detector 212, the X-ray object detection data is obtained according to a detection result of the X-ray detector 212, and the neutron object-free detection data is obtained according to a detection result of the neutron detector 222; when the inspected object is placed between the second detection port 221 and the neutron detector 222, the X-ray object-free detection data is obtained according to a detection result of the X-ray detector 212, and the neutron object detection data is obtained according to a detection result of the neutron detector 222.

By such a method, it is possible to acquire four data items by one time of switching and two times of detecting operations, thereby substance identification can be realized, and the time of data collection can be saved.

Figure 3A:
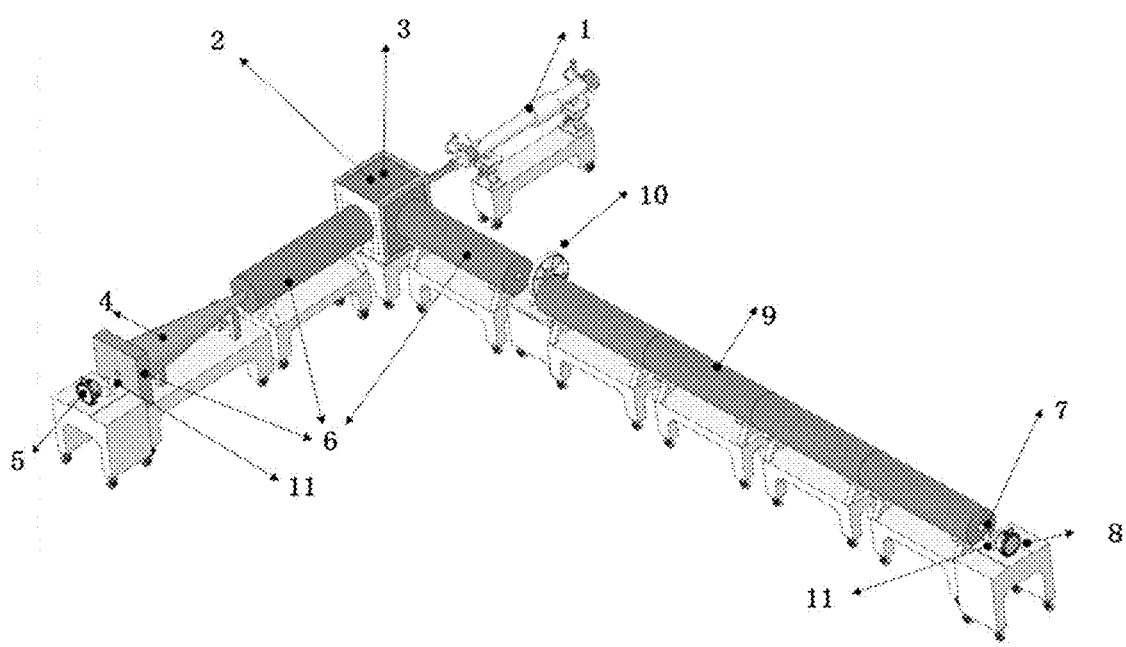
FIG. 3A is a perspective diagram of the dual mode detection device employed in the dual mode detection method according to some embodiments of the present disclosure.
Figure 3B:
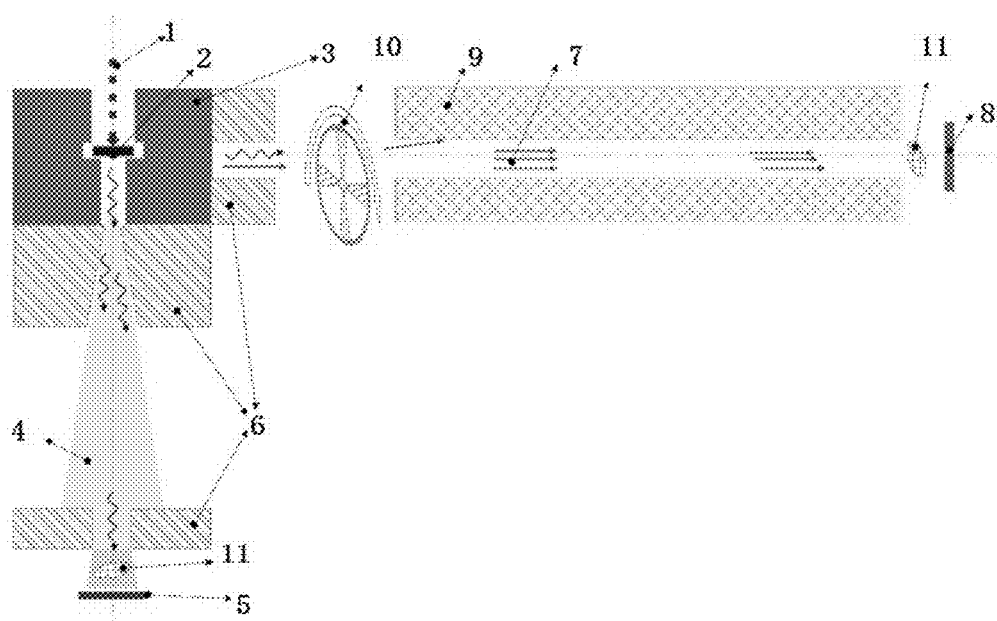
FIG. 3B is a cross-sectional view of the dual mode detection device employed in the dual mode detection method according to some embodiments of the present disclosure.

In some embodiments, in order to reduce the interference of X-rays to the neutron beam, a dual mode detection device shown in FIGS. 3A, 3B can be employed. FIG. 3A is a perspective diagram of a dual mode detection device employed in the dual mode detection method according to some embodiments of the present disclosure. The electron linear accelerator 1 operates in a pulse mode. The emitted electrons bombard the X-ray conversion target 2, and generate forward recoil X-rays, and some of these X-rays form an imaging X-ray beam 4 after being shielded by the X-ray collimator 6. The imaging X-ray beam 4 penetrates through the inspected object 11 and then is measured by the X-ray imaging detector 5.

A neutron conversion target 3 is disposed beside the X-ray conversion target 2, and a portion of the X-rays generated by the X-ray conversion target 2 react with the neutron conversion target 3 to generate a neutron beam 7 for neutron imaging. In some embodiments, the extraction direction of the neutron beam 7 is perpendicular or substantially perpendicular to the direction of the electrons bombarding the X-ray conversion target, wherein "substantially perpendicular" includes "approximate vertical", such as [85°, 95°]. Such an arrangement takes the recoil effect of the X-rays (X-rays have a forward momentum) into account, since the X-ray intensity in the 90-degree direction is relatively weak, the interference of the X-ray pulses on the neutron beam can be attenuated.

In some embodiments, a high-energy electron accelerator can be utilized to generate X-rays that react with a neutron conversion target (e.g., heavy water D2O) by (γ, n) reaction to produce neutrons, which go through neutron moderation, and decelerated and reflected by a reflector, and exit from a predetermined direction.

The neutron beam 7 passes through the inspected object 11 and is measured by the neutron detector 8. In some embodiments, in order to improve the measurement environment, a neutron collimator 9 may be placed between the neutron conversion target 3 and the neutron detector to collimate the neutron beam stream 7. Moreover, in some embodiments, an X-ray chopper 10 can also be placed between the neutron conversion target 3 and the second detection port, to reduce the influence of X-ray pulses on the neutron detector.

In some embodiments, the positional relationship between the X-ray conversion target 2 and the neutron conversion target 3 can be as shown in FIG. 3B. The neutron conversion target 3 is located on a side of the X-ray conversion target 2, and they are substantially perpendicular to each other. In FIG. 3B, X-rays are labeled by arrowed curves, and neutrons are labeled by arrowed straight lines. It can be seen that, after passing through the X-ray chopper 10, X-rays are removed, and neutron beams are remained to detect the object 11.

Such a dual-mode detection device can simultaneously generate an X-ray beam and a neutron beam using a single electron accelerator, which reduces the cost, reduces the size of the device, and facilitates the determination of the substance type in the object by using a single device.

In some embodiments, the X-ray source can be realized by using an X-ray conversion target (W-Au composite target) bombarded with electrons from a pulsed linear electron accelerator, and the accelerator may be any existing 2.5 MeV~15 MeV accelerator (9 MeV, 15 MeV accelerators have been successfully used in industrial imaging systems).

The neutrons of this ray source are generated by using X-rays in a (γ, n) reaction. Table 1 shows the photoneutron reaction thresholds and photoneutron cross sections of some common nuclides. It can be seen that the thresholds are usually around 7 MeV, which is comparable to the average binding energy of the nucleus, wherein, 9Be and 2H have the lowest thresholds of 1.67 MeV and 2.223 MeV, respectively. The photoneutron reaction thresholds and photoneutron cross sections of different nuclides are as follows.

TABLE 1 photoneutron reaction thresholds and photoneutron cross sections of different nuclides1

| nuclide | threshold energy | maximum cross-section | natural abundance |
| --- | --- | --- | --- |
| $^9$Be | 1.67 | 1.5 mb | 100% |
| $^2$H | 2.23 | 2.4 mb | 0.015%, >99% after enrichment |

TABLE 1-continued photoneutron reaction thresholds and photoneutron cross sections of different nuclides1

| nuclide | threshold energy | maximum cross-section | natural abundance |
| --- | --- | --- | --- |
| $^{13}$C | 4.95 | <1 mb | 1.11% |
| $^{17}$O | 4.14 | <1 mb | 0.04% |
| $^{43}$Ca | 7.93 | ~2 mb | 0.135% |
| $^{53}$Cr | 7.94 | ~2 mb | 9.5% |
| $^{57}$Fe | 7.65 | ~4 mb | 2.1% |
| $^{61}$Ni | 7.82 | ~4 mb | 1.13% |
| $^{67}$Zn | 7.05 | ~5 mb | 4.1% |
| $^{95}$Mo | 7.40 | ~12 mb | 15.72% |
| $^{97}$Mo | 6.80 | ~20 mb | 9.46% |
| $^{115}$Sn | 7.50 | ~100 mb | 0.4% |
| $^{117}$Sn | 6.90 | ~20 mb | 7.7% |
| $^{119}$Sn | 6.50 | ~20 mb | 8.6% |
| $^{181}$Ta | 7.58 | ~70 mb | 100% |
| $^{183}$W | 6.19 | ~75 mb | 14.3% |
| $^{184}$W | 7.41 | ~70 mb | 30.7% |
| $^{186}$W | 7.20 | ~80 mb | 28.6% |

In some embodiments, considering the relationship between the photoneutron reaction cross section, and the accelerator energy, the protection condition, an electron accelerator of 2.5 to 10 MeV can be used. These accelerators perform better in terms of both technical maturity and cost. A higher energy accelerator is inconvenient due to the occurrence of air activation.

Figure 4:
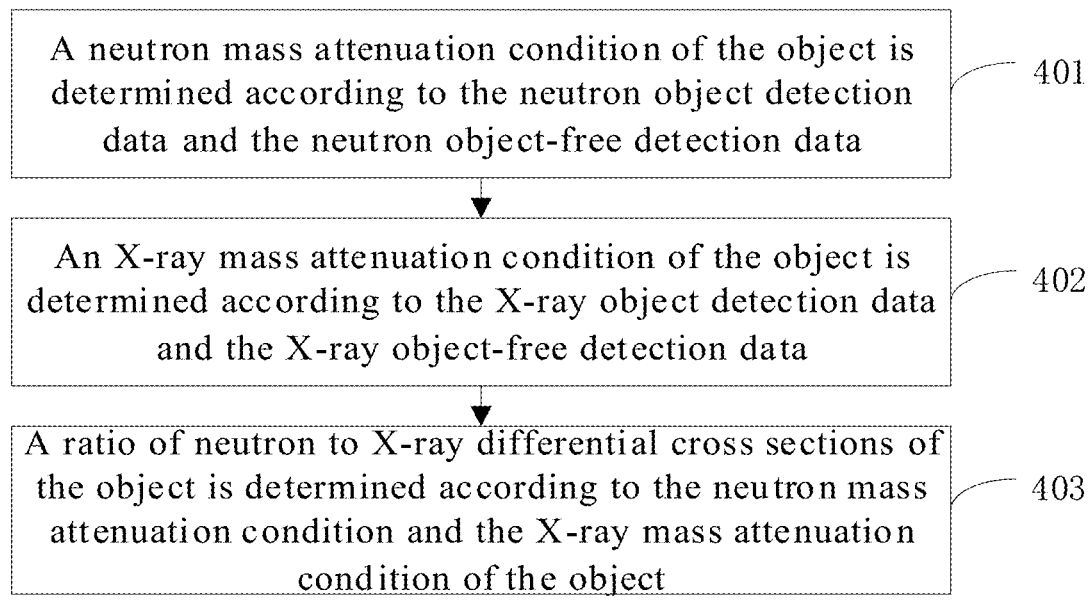
FIG. 4 is a flowchart of determining the ratio of neutron to X-ray differential cross sections of an object in the dual mode detection method according to some embodiments of the present disclosure.

FIG. 4 is a flowchart of determining a ratio of neutron to X-ray differential cross sections of an inspected object in the dual mode detection method according to some embodiments of the present disclosure.

At step 401, a neutron mass attenuation condition of the inspected object is determined according to the neutron object detection data and the neutron object-free detection data.

At step 402, an X-ray mass attenuation condition of the object is determined according to the X-ray object detection data and the X-ray object-free detection data.

In some embodiments, according to the formula:

$$I_{n,D}=I_{n,x} \cdot e^{-\mu_n t}=I_{n,0} \cdot e^{-\mu_{n,m} t_m}$$

the following formula can be derived:

$$\mu_{D,mtm}=\ln(I_{n,0}/I_{n,D}) \quad (1)$$

$$\text{Similarly,} \mu_{X,mtm}=\ln(I_{X,0}/I_{X,D}) \quad (2)$$

$I_{n,0}$, $I_{n,D}$, $I_{X,0}$ and $I_{X,D}$ are neutron object-free detection data, neutron object detection data, X-ray object-free detection data, and X-ray object detection data, respectively; $\mu_n$ and $\mu_{n,m}$ are respectively neutron linearity coefficient and mass attenuation coefficient; $\mu_X$ and $\mu_{X,m}$ are respectively X-ray linearity coefficient and mass attenuation coefficient; t and $t_m$ are the thickness and mass thickness of the inspected object, respectively. Since the Compton scattering of the MeV energy photons is dominant, $\mu_{n,m}$, $\mu_{X,m}$ can be regarded as constants in this energy region.

At step 403, a ratio of neutron to X-ray differential cross sections of the inspected object is determined according to the neutron mass attenuation condition and the X-ray mass attenuation condition of the inspected object. In some embodiments, combining formulas (1), (2), the following formula can be derived:

$$\frac{1}{\mu_{X,m}}\ln\left(\frac{I_{X,0}}{I_{X,D}}\right) = t_m = \frac{1}{\mu_{n,m}}\ln\left(\frac{I_{n,0}}{I_{n,D}}\right)$$

the formula can be rewritten as:

$$\frac{\mu_{n,m}}{\mu_{X,m}} = \frac{\ln\left(\frac{I_{n,0}}{I_{n,D}}\right)}{\ln\left(\frac{I_{X,0}}{I_{X,D}}\right)}$$

Since the mass attenuation coefficient $\mu_m$ is the ratio of the differential cross section $\sigma$ to the atomic mass $m_A$, the above equation can be further rewritten as:

$$\frac{\mu_{n,m}}{\mu_{X,m}} = \frac{\sigma_n/m_A}{\sigma_X/m_A} = \frac{\sigma_n}{\sigma_X} = \frac{\ln\left(\frac{I_{n,0}}{I_{n,D}}\right)}{\ln\left(\frac{I_{X,0}}{I_{X,D}}\right)}$$

Provided:

$$F(n) = \frac{\ln\left(\frac{I_{n,0}}{I_{n,D}}\right)}{\ln\left(\frac{I_{X,0}}{I_{X,D}}\right)} \quad (3)$$

then the formula can be rewritten as $$F(n) = \frac{\sigma_n}{\sigma_X}$$

It can be seen that the measured value F(n) is determined by the attenuation of the neutrons and the attenuation of the X-rays. F(n) is independent of the mass thickness (or thickness) of the inspected object, but is determined only by the neutron or X-ray differential cross section of the nucleus or atom of the inspected object; in other words, (under the premise of specified neutron and X-ray energy) F(n) is determined only by the nucleus/atom property of the substance. Therefore, a substance type can be identified according to F (n).

In this way, a ratio of neutron to X-ray differential cross sections of the inspected object can be obtained by mathematical calculation based on the neutron object-free detection data, the neutron object detection data, the X-ray object-free detection data, and the X-ray object detection data. The substance type can be conveniently determined based on this ratio, and the efficiency of substance determination can be improved.

Figure 5:
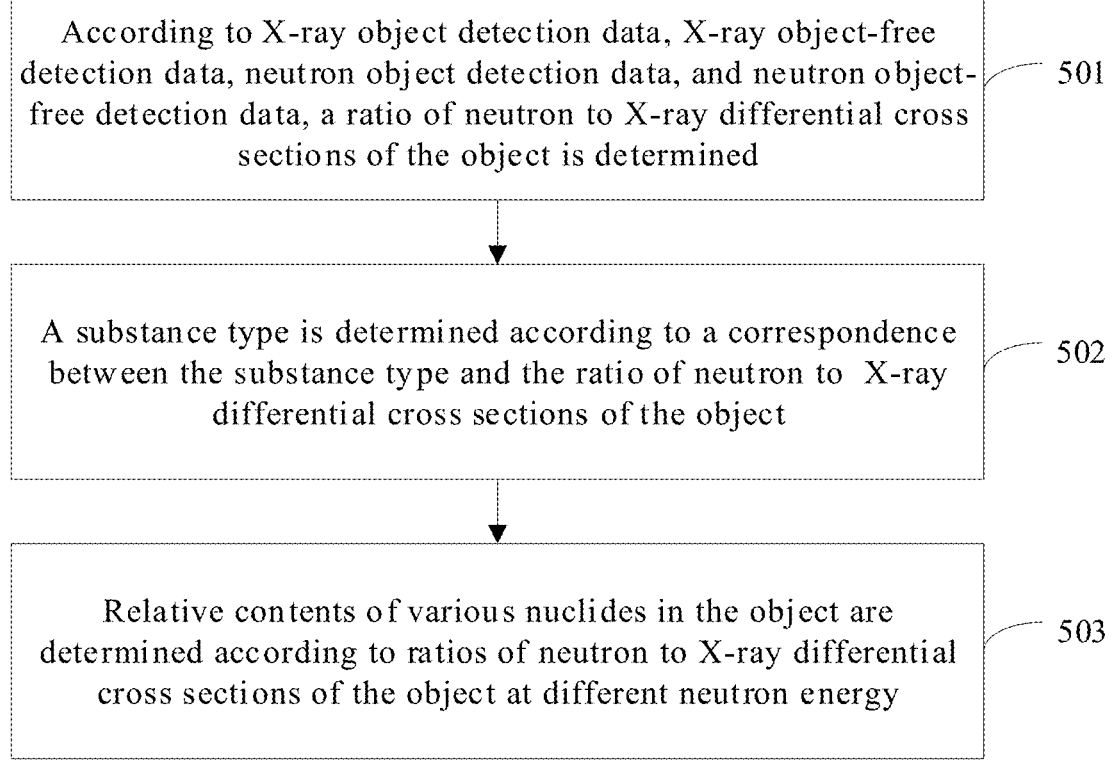
FIG. 5 is a flowchart of the dual mode detection method according to other embodiments of the present disclosure.

FIG. 5 is a flowchart of a dual mode detection method according to other embodiments of the present disclosure.

At step 501, according to X-ray object detection data, X-ray object-free detection data, neutron object detection data, and neutron object-free detection data, a ratio of neutron to X-ray differential cross sections of the inspected object is determined.

At step 502, a substance type is determined according to the correspondence between the ratio of neutron to X-ray differential cross sections of the inspected object and the substance type.

At step 503, relative contents of various nuclides in the inspected object are determined according to ratios of neutron to X-ray differential cross sections of the inspected object at different neutron energy.

In some embodiments, F(n) obtained in imaging under various neutron energy may be used, and the following formula can be derived:

$$\begin{bmatrix} F(n_1) \\ F(n_2) \\ \vdots \\ F(n_m) \end{bmatrix} = \begin{bmatrix} \frac{\sigma_{n_1,1}}{\sigma_{X,1}}, \frac{\sigma_{n_1,2}}{\sigma_{X,2}}, \cdots, \frac{\sigma_{n_1,k}}{\sigma_{X,k}} \\ \frac{\sigma_{n_2,1}}{\sigma_{X,1}}, \frac{\sigma_{n_2,2}}{\sigma_{X,2}}, \cdots, \frac{\sigma_{n_2,k}}{\sigma_{X,k}} \\ \vdots \\ \frac{\sigma_{n_m,1}}{\sigma_{X,1}}, \frac{\sigma_{n_m,2}}{\sigma_{X,2}}, \cdots, \frac{\sigma_{n_m,k}}{\sigma_{X,m}} \end{bmatrix} \begin{bmatrix} A_1 \\ A_2 \\ \vdots \\ A_k \end{bmatrix}$$

wherein, F(n1,2 . . . ,m) is F(n) obtained by using an energy-variable ray source, m is the number of energy regions of neutron, and $A_{l \ldots k}$ are relative contents of various main nuclides in the inspected object. The elements in the right matrix reflect corresponding F(n) values of different nuclides in different energy regions. The value of m can be adjusted during the measurement, if m=k, relative contents $A_1 \sim A_k$ of various types of nuclides are determined by the formula:

$$\begin{bmatrix} A_1 \\ A_2 \\ \vdots \\ A_k \end{bmatrix} = \begin{bmatrix} \frac{\sigma_{n_1,1}}{\sigma_{X,1}}, \frac{\sigma_{n_1,2}}{\sigma_{X,2}}, \cdots, \frac{\sigma_{n_1,k}}{\sigma_{X,k}} \\ \frac{\sigma_{n_2,1}}{\sigma_{X,1}}, \frac{\sigma_{n_2,2}}{\sigma_{X,2}}, \cdots, \frac{\sigma_{n_2,k}}{\sigma_{X,k}} \\ \vdots \\ \frac{\sigma_{n_m,1}}{\sigma_{X,1}}, \frac{\sigma_{n_m,2}}{\sigma_{X,2}}, \cdots, \frac{\sigma_{n_m,k}}{\sigma_{X,m}} \end{bmatrix}^{-1} \begin{bmatrix} F(n_1) \\ F(n_2) \\ \vdots \\ F(n_m) \end{bmatrix} \quad (4)$$

wherein $\sigma_{n_i,j}$ is the neutron differential cross section of the j-th nuclide in the i-th energy region, $\sigma_{X,j}$ is the X-ray differential cross section of the j-th nuclide, $F(n_i)$ is the ratio of neutron to X-ray differential cross sections of the inspected object with respect to neutrons and X-rays in the i-th energy region, and $A_j$ is the relative content of the j-th nuclide, $1 \leq i \leq m, 1 \leq j \leq k$, m is the number of neutron energy regions, k is the number of the nuclides types. The number of energy regions may be adjusted during the measurement so that m=k.

In this way, the content and composition of each element (nuclide) in the inspected object can be further determined, and the accuracy of detection can be further improved.

Figure 6:
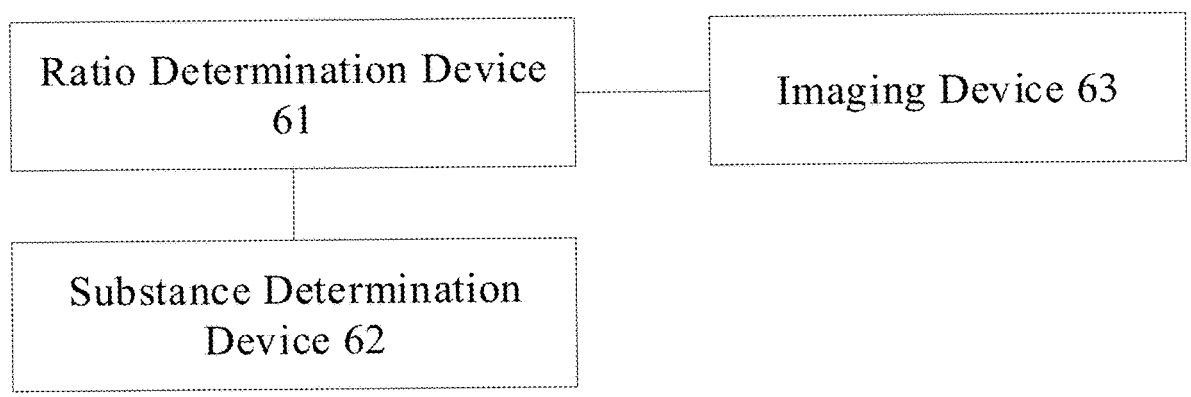
FIG. 6 is a schematic diagram of the dual mode detection controller according to some embodiments of the present disclosure.

FIG. 6 is a schematic diagram of the dual mode detection controller according to some embodiments of the present disclosure. A ratio determination device 61 can determine a ratio of neutron to X-ray differential cross sections of the inspected object according to the X-ray object detection data, the X-ray object-free detection data, the neutron object detection data, and the neutron object-free detection data. In some embodiments, the X-ray object detection data, X-ray object-free detection data, neutron object detection data, and neutron object-free detection data may be obtained by placing the inspected object in the X-ray detection area and the neutron detection area respectively, while maintaining the ray intensity of an X-ray source and a neutron source unchanged. Since the thickness of the inspected object is constant, a ratio of neutron to X-ray differential cross sections of the inspected object can be calculated based on the above data. A substance determination device 62 can perform substance identification according to the ratio of neutron to X-ray differential cross sections of the inspected object. In some embodiments, the substance type of the inspected object can be determined through comparison the calculated ratio with ratios of neutron to X-ray differential cross sections of different substances that are stored in advance.

This controller can obtain detection data with X-rays and neutrons attenuated and not attenuated by the inspected object, thereby the ratio of neutron to X-ray differential cross sections of the inspected object can be obtained. A substance type of the inspected object is then determined by the correspondence between different substances and ratios of neutron to X-ray differential cross sections of the substances, thereby realizing the dual energy detection of the inspected object by using neutrons and X-rays. Because of different neutron and X-ray attenuation capabilities of different substances, a nuclide type can be recognized, so that element type identification can be realized, and the accuracy of detection can be improved.

In some embodiments, the dual mode controller may further comprise an imaging device 63 that can perform imaging based on the ratio of neutron to X-ray differential cross sections of the inspected object, such as displaying in different colors for different ratio ranges, or highlighting determined dangerous substances, thereby the detection results is visualized and the user friendliness is improved.

FIG. 7 is a schematic diagram of the ratio determination device in the dual mode detection controller according to some embodiments of the present disclosure. A detection data acquisition unit 711 can, when the inspected object is placed at the first detection port, obtain X-ray object detection data according to the detection result of the X-ray detector, and obtain neutron object-free detection data according to the detection result of the neutron detector; when the inspected object is placed at the second detection port, obtain neutron object detection data according to the detection result of the neutron detector, and obtain X-ray object-free detection data according to the detection result of the X-ray detector, wherein, the first detection port emits X-rays, and the second detection port emits neutrons. In some embodiments, the dual mode detection device may be as shown in FIGS. 2, 3A, 3B. A ratio calculation unit 712 determines a ratio of neutron to X-ray differential cross sections of the inspected object according to X-ray object detection data, X-ray object-free detection data, neutron object detection data, and neutron object-free detection data.

This dual mode detection controller can acquire four data items by one time of switching and two times of detecting operations, thereby substance identification can be realized, and the time of data collection can be saved.

In some embodiments, the ratio determination device can calculate the neutron mass attenuation of the object the and the X-ray mass attenuation of the object in the way shown in FIG. 4 respectively, and then determine a ratio of neutron to X-ray differential cross sections of the inspected object. The ratio determination device can also directly use the formula (3) above to determine the ratio determination device F(n).

This dual mode detection controller can obtain a ratio of neutron to X-ray differential cross sections of the inspected object by mathematical calculation based on the neutron object-free detection data, the neutron object detection data, the X-ray object-free detection data, and the X-ray object detection data, so that the substance type can be conveniently determined based on this ratio, and the efficiency of substance determination can be improved.

In some embodiments, the ratio determination device may further determine relative contents of various nuclides in the inspected object using the above formula (4), according to the ratios of neutron to X-ray differential cross sections of the inspected object at different neutron energy, so that the content and composition of each element in the inspected object can be further determined, and the accuracy of detection can be further improved.

Figure 8:
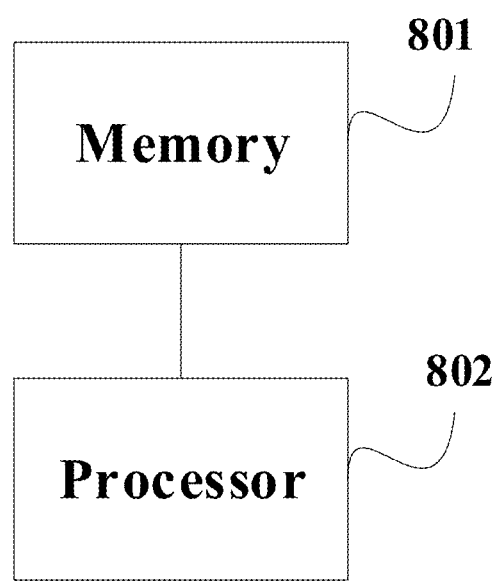
FIG. 8 is a schematic diagram of the dual mode detection controller according to other embodiments of the present disclosure.

FIG. 8 is a schematic diagram of a dual mode detection controller according to some embodiments of the present disclosure. The dual mode detection controller comprises a memory 801 and a processor 802. Wherein, the memory 801 may be a magnetic disk, flash memory or any other non-volatile storage medium. The memory is used to store the instructions of a dual mode detection method according to a corresponding embodiment described above. The processor 802 is coupled to the memory 801 and may be implemented as one or more integrated circuits, such as a microprocessor or microcontroller. The processor 802 is configured to execute instructions stored in the memory, and can realize dual-energy detection of an object by using neutrons and X-rays. Because of different neutron and X-ray attenuation capabilities of different substances, element type identification can be realized and the accuracy of detection can be improved.

Figure 9:
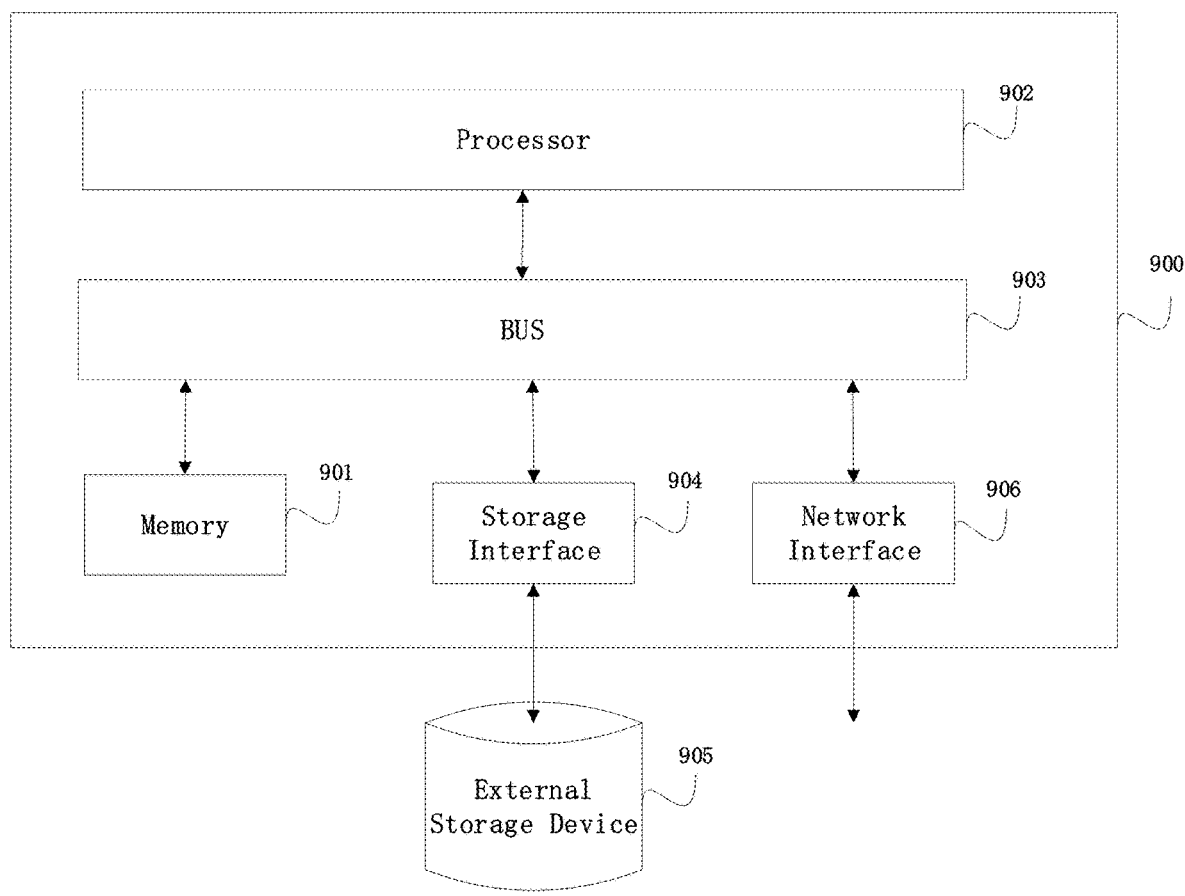
FIG. 9 is a schematic diagram of the dual mode detection controller according to further embodiments of the present disclosure.

In some embodiments, as shown in FIG. 9, the dual mode detection controller 900 includes a memory 901 and a processor 902. The processor 902 is coupled to the memory 901 via a bus 903. The dual mode detection controller 900 may be further connected to an external storage device 905 through a storage interface 904 to access external data, and may be further connected to a network or another computer system (not shown) through a network interface 906, the details of which will not described herein.

In this embodiment, through storing data instructions in the memory and processing the above instructions by the processor, dual-energy detection of an object can be realized by using neutrons and X-rays. Because of different neutron and X-ray attenuation capabilities of different substances, element type identification can be realized and the accuracy of detection can be improved.

In still other embodiments, there is provided a computer readable storage medium having stored thereon computer program instructions that, when executed by a processor, implement the steps of the dual mode detection method according to a corresponding embodiment. One skilled in the art should understand that, the embodiments of the present disclosure may be provided as a method, an apparatus, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (including but not limited to disk storage, CD-ROM, optical memory, etc.) having computer-usable program code embodied therein.

Figure 10:
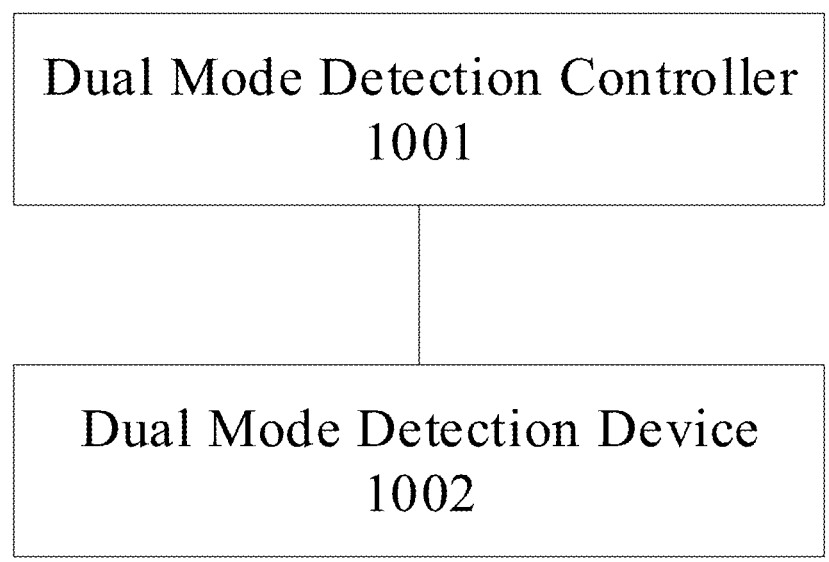
FIG. 10 is a schematic diagram of the dual mode detection system according to some embodiments of the present disclosure.

FIG. 10 is a schematic diagram of a dual mode detection system according to some embodiments of the present disclosure. The dual mode detection controller 1001 may be any of the dual mode detection controllers mentioned above. The dual mode detection device 1002 may include a single electron accelerator capable of synchronously emitting electrons to an X-ray conversion target and a neutron conversion target; the X-ray conversion target is configured to generate X-rays under excitation of electrons and emit the X-rays from a first detection port; the neutron conversion target is configured to generate neutrons under excitation of electrons and emit the neutrons from a second detection port.

This dual mode detection system can detect and obtain detection data with X-rays and neutrons attenuated and not attenuated by the inspected object, thereby a ratio of neutron to X-ray differential cross sections of the inspected object can be obtained. A substance type of the inspected object is then determined by the correspondence between different substances and ratios of neutron to X-ray differential cross sections of the substances, thereby realizing the dual energy detection of the inspected object by using neutrons and X-rays. Because of different neutron and X-ray attenuation capabilities of different substances, a nuclide type can be recognized, so that element type identification can be realized, and the accuracy of detection can be improved.

In some embodiments, the dual mode detection device may be as shown in FIGS. 3A and 3B. An X-ray chopper 10 is included between the neutron conversion target 3 and the second detection port, to reduce the influence of X-ray pulses on the neutron detector.

In some embodiments, an X-ray collimator may be included between the X-ray conversion target 2 and the first detection port, and a neutron collimator is included between the neutron conversion target and the second detection port, so that the X-ray and the neutron beam can be collimated.

In some embodiments, taking into account the recoil effect of X-rays, since the X-ray intensity in the 90-degree direction is relatively weak, a line connecting the first detection port and the X-ray conversion target is arranged to be perpendicular or substantially perpendicular to a line connecting the second detection port and the neutron beam conversion target, thereby the interference of the X-ray pulses on the neutron beam can be attenuated.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture including instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

Heretofore, the present disclosure has been described in detail. In order to avoid obscuring the concepts of the present disclosure, some details known in the art are not described. Based on the above description, those skilled in the art can understand how to implement the technical solutions disclosed herein.

The method and apparatus of the present disclosure may be implemented in many ways. For example, the method and apparatus of the present disclosure may be implemented by software, hardware, firmware, or any combination of software, hardware, and firmware. The above sequence of steps of the method is merely for the purpose of illustration, and the steps of the method of the present disclosure are not limited to the above-described specific order unless otherwise specified. In addition, in some embodiments, the present disclosure may also be implemented as programs recorded in a recording medium, which include machine-readable instructions for implementing the method according to the present disclosure. Thus, the present disclosure also covers a recording medium storing programs for executing the method according to the present disclosure.

It shall be noted that: the above embodiments are merely illustration of the technical solution of this disclosure, but are not limitation thereof. Although the present disclosure has been described in detail with embodiments, those ordinary skilled in the art shall understand: embodiments of the present disclosure may be modified or some technical features thereof may be substituted equivalently, without departing from the spirit of the technical solution of the present disclosure, all of which shall be encompassed in the scope of the technical solution as claimed in the present disclosure.

The invention claimed is:

1. A dual mode detection method, comprising:
   determining a ratio of neutron to X-ray differential cross sections of an inspected object, according to X-ray object detection data, X-ray object-free detection data, neutron object detection data, and neutron object-free detection data; and
   determining a substance type of the inspected object according to a correspondence between the ratio of neutron to X-ray differential cross sections of the inspected object and the substance type.

2. The dual mode detection method according to claim 1, wherein
   when the inspected object is placed between a first detection port of the dual mode detection device and an X-ray detector, obtaining the X-ray object detection data according to a detection result of the X-ray detector, and obtaining the neutron object-free detection data according to a detection result of a neutron detector;
   when the inspected object is placed between a second detection port of the dual mode detection device and the neutron detector, obtaining the X-ray object-free detection data according to a detection result of the X-ray detector, and obtaining the neutron object detection data according to a detection result of the neutron detector; and
   wherein, the first detection port emits X-rays, and the second detection port emits neutrons.

3. The dual mode detection method according to claim 2, wherein the dual mode detection device simultaneously emits electrons to an X-ray conversion target and a neutron conversion target through a single electron accelerator, X-rays generated by the X-ray conversion target emitted from the first detection port, and neutrons generated by the neutron conversion target emitted from the second detection port.

4. The dual mode detection method according to claim 1, wherein determining the ratio of neutron to X-ray differential cross sections of the inspected object comprises:
 determining a neutron mass attenuation condition of the inspected object according to the neutron object detection data and the neutron object-free detection data;
 determining an X-ray mass attenuation condition of the inspected object according to the X-ray object detection data and the X-ray object-free detection data; and
 determining the ratio of neutron to X-ray differential cross sections of the inspected object according to the neutron mass attenuation condition and the X-ray mass attenuation condition of the inspected object.

5. The dual mode detection method according to claim 1, wherein determining the ratio of neutron to X-ray differential cross sections of the inspected object comprises:
 determining the ratio F(n) of neutron n to X-ray differential cross sections of the inspected object according to a formula:

$$F(n) = \frac{\sigma_n}{\sigma_X} = \frac{\ln\left(\frac{I_{n,0}}{I_{n,D}}\right)}{\ln\left(\frac{I_{X,0}}{I_{X,D}}\right)}$$

wherein $\sigma n$ is a neutron differential cross section of the inspected object, and $\sigma x$ is the X-ray differential cross section of the inspected object, $I_{n,0}$ is the neutron object-free detection data, $I_{n,D}$ is the neutron object detection data, $I_{x,0}$ is the X-ray object-free detection data, and $I_{x,D}$ is the X-ray object detection data.

6. The dual mode detection method according to claim 1, further comprising:
 determining relative contents of various nuclides in the inspected object according to ratios of neutron to X-ray differential cross sections of the inspected object at different neutron energy.

7. The dual mode detection method according to claim 6, wherein determining relative contents of various nuclides in the inspected object comprises:
 determining the relative contents Al~Ak of various types of nuclides according to a formula:

$$\begin{bmatrix} A_1 \\ A_2 \\ \vdots \\ A_k \end{bmatrix} = \begin{bmatrix} \frac{\sigma_{n_1,1}}{\sigma_{X,1}}, \frac{\sigma_{n_1,2}}{\sigma_{X,2}}, \ldots, \frac{\sigma_{n_1,k}}{\sigma_{X,k}} \\ \frac{\sigma_{n_2,1}}{\sigma_{X,1}}, \frac{\sigma_{n_2,2}}{\sigma_{X,2}}, \ldots, \frac{\sigma_{n_2,k}}{\sigma_{X,k}} \\ \vdots \\ \frac{\sigma_{n_m,1}}{\sigma_{X,1}}, \frac{\sigma_{n_m,2}}{\sigma_{X,2}}, \ldots, \frac{\sigma_{n_m,k}}{\sigma_{X,m}} \end{bmatrix}^{-1} \begin{bmatrix} F(n_1) \\ F(n_2) \\ \vdots \\ F(n_m) \end{bmatrix}$$

where $\sigma_{nij}$ is a neutron differential cross section of the j-th nuclide in the i-th energy region, $\sigma_{Xj}$ is the X-ray differential cross section of the j-th nuclide, F(ni) is the ratio of neutron to X-ray differential cross sections of the inspected object with respect to neutrons and X-rays in the i-th energy region, and Aj is the relative content of the j-th nuclide, $1 \leq i \leq m, 1 \leq j \leq k$, m is a number of neutron energy regions, k is a number of nuclides types, wherein a number of energy regions is adjusted during a measurement so that m=k.

8. The dual mode detection method according to claim 1, further comprising:
 imaging according to the ratio of neutron to X-ray differential cross sections of the inspected object.

9. A dual mode detection controller, comprising:
 a ratio determination module configured to determine a ratio of neutron to X-ray differential cross sections of an inspected object, according to X-ray object detection data, X-ray object-free detection data, neutron object detection data, and neutron object-free detection data; and
 a substance determination module configured to determine a substance type of an inspected object identification according to the ratio of neutron to X-ray differential cross sections of the inspected object.

10. The dual mode detection controller according to claim 9, wherein the ratio determination module comprises:
 a detection data acquisition unit configured to, when the inspected object is placed at a first detection port, obtain the X-ray object detection data according to a detection result of an X-ray detector, and obtain the neutron object-free detection data according to a detection result of a neutron detector; when the inspected object is placed at a second detection port, obtain the neutron object detection data according to a detection result of the neutron detector, and obtain the X-ray object-free detection data according to a detection result of the X-ray detector, wherein the first detection port emits X-rays, and the second detection port emits neutrons; and
 a ratio calculation unit configured to determine the ratio of neutron to X-ray differential cross sections of the inspected object according to the X-ray object detection data, the X-ray object-free detection data, the neutron object detection data, and the neutron object-free detection data.

11. The dual mode detection controller according to claim 10, wherein the ratio calculation unit is configured to:
 determine a neutron mass attenuation condition of the inspected object according to the neutron object detection data and the neutron object-free detection data;
 determine an X-ray mass attenuation condition of the inspected object according to the X-ray object detection data and the X-ray object-free detection data;
 determine the ratio of neutron to X-ray differential cross sections of the inspected object according to the neutron mass attenuation condition and the X-ray mass attenuation condition of an object; and
 the substance determination module is configured to determine a substance type of the inspected object according to a correspondence between the ratio of neutron to X-ray differential cross sections of the inspected object and the substance type.

12. The dual mode detection controller according to claim 10, wherein the ratio calculation unit is configured to:
 determine a ratio F(n) of neutron n to the X-ray differential cross sections of the inspected object according to a formula:

$$F(n) = \frac{\sigma_n}{\sigma_X} = \frac{\ln\left(\frac{I_{n,0}}{I_{n,D}}\right)}{\ln\left(\frac{I_{X,0}}{I_{X,D}}\right)}$$

wherein $\sigma_n$ is a neutron differential cross section of the inspected object, and $\sigma_x$ is the X-ray differential cross section of the inspected object, $I_{n,0}$ is the neutron object-free detection data, $I_{n,D}$ is the neutron object detection data, $I_{x,0}$ is the X-ray object-free detection data, and $I_{x,D}$ is the X-ray object detection data.

13. The dual mode detection controller according to claim 9, wherein the substance determination module is further configured to:
determine relative contents of various nuclides in the inspected object according to ratios of neutron to X-ray differential cross sections of the inspected object at different neutron energy.

14. The dual mode detection controller according to claim 13, wherein determining relative contents of various nuclides in the inspected object comprises:
determining the relative contents $A_1 \sim A_k$ of various types of nuclides according to a formula:

$$\begin{bmatrix} A_1 \\ A_2 \\ \vdots \\ A_k \end{bmatrix} = \begin{bmatrix} \frac{\sigma_{n_1,1}}{\sigma_{X,1}}, \frac{\sigma_{n_1,2}}{\sigma_{X,2}}, \ldots, \frac{\sigma_{n_1,k}}{\sigma_{X,k}} \\ \frac{\sigma_{n_2,1}}{\sigma_{X,1}}, \frac{\sigma_{n_2,2}}{\sigma_{X,2}}, \ldots, \frac{\sigma_{n_2,k}}{\sigma_{X,k}} \\ \vdots \\ \frac{\sigma_{n_m,1}}{\sigma_{X,1}}, \frac{\sigma_{n_m,2}}{\sigma_{X,2}}, \ldots, \frac{\sigma_{n_m,k}}{\sigma_{X,m}} \end{bmatrix}^{-1} \begin{bmatrix} F(n_1) \\ F(n_2) \\ \vdots \\ F(n_m) \end{bmatrix}$$

where $\sigma_{nij}$ is a neutron differential cross section of the j-th nuclide in the i-th energy region, $\sigma_{X,j}$ is the X-ray differential cross section of the j-th nuclide, F(ni) is the ratio of neutron to X-ray differential cross sections of the inspected object with respect to neutrons and X-rays in the i-th energy region, and is the relative content of the j-th nuclide, $1 \leq i \leq m, 1 \leq j \leq k$, m is a number of neutron energy regions, k is a number of nuclides types, wherein a number of energy regions is adjusted during a measurement so that m=k.

15. The dual mode detection controller according to claim 9, further comprising:
an imaging module configured to perform imaging according to the ratio of neutron to X-ray differential cross sections of the inspected object.

16. A dual mode detection controller, comprising:
a memory; and
a processor coupled to the memory, the processor is configured to perform a method based on a program stored in the memory according to claim 1.

17. A computer readable storage medium on which computer program instructions are stored, which implement the steps of the method according to any one of claim 1 when executed by a processor.

18. A dual mode detection system, comprising:
a dual mode detection controller of any one of claim 9; and
a dual mode detection device, comprising:
a single electron accelerator configured to synchronously emit electrons to an X-ray conversion target and a neutron conversion target;
the X-ray conversion target is configured to generate X-rays under excitation of electrons and emit the X-rays from a first detection port; and
the neutron conversion target is configured to generate neutrons under excitation of electrons and emit neutrons from a second detection port.

19. The dual mode detection system according to claim 18, wherein the dual mode detection device comprises at least one of:
an X-ray chopper located between the neutron conversion target and the second detection port;
an X-ray collimator located between the X-ray conversion target and the first detection port;
or
a neutron collimator located between the neutron conversion target and the second detection port.

20. The dual mode detection system according to claim 18, wherein a line connecting the first detection port and the X-ray conversion target is substantially perpendicular to a line connecting the second detection port and the neutron conversion target.

* * * * *